United States Patent
Bates, III et al.

(10) Patent No.: US 6,413,159 B1
(45) Date of Patent: Jul. 2, 2002

(54) AIRPLANE CABIN OVERHEAD AIR OUTLETS

(75) Inventors: George Bates, III, Bothell, WA (US); Glenn Sitler, Southwick; Rory C. Keogh, Sommerville, both of MA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/607,503

(22) Filed: Jun. 28, 2000

(51) Int. Cl.[7] ............................................... B64D 13/00
(52) U.S. Cl. ......................................... 454/76; 454/301
(58) Field of Search ........................ 454/76, 108, 137, 454/152, 301

(56) References Cited

U.S. PATENT DOCUMENTS

| | | | |
|---|---|---|---|
| 2,902,918 A | * | 9/1959 | Swarner |
| 3,687,054 A | * | 8/1972 | Boberg |
| 4,679,495 A | | 7/1987 | Locker |
| 4,726,285 A | | 2/1988 | Kelley |
| 4,819,548 A | * | 4/1989 | Horstman |
| 4,896,588 A | | 1/1990 | Monda et al. |
| 4,898,087 A | | 2/1990 | Fitzner et al. |
| 5,111,739 A | | 5/1992 | Hall ............................ 454/306 |
| 5,338,254 A | | 8/1994 | Farrington .................... 454/284 |
| 5,518,448 A | * | 5/1996 | Madoglio et al. |

FOREIGN PATENT DOCUMENTS

| | | | | |
|---|---|---|---|---|
| GB | 1217597 A | * | 12/1970 | ................. 454/301 |
| SU | 1175738 A | * | 8/1985 | ................. 454/108 |
| SU | 1721401 A | * | 3/1992 | ................. 454/301 |

* cited by examiner

*Primary Examiner*—Harold Joyce
(74) *Attorney, Agent, or Firm*—Conrad O. Gardner

(57) ABSTRACT

Passenger cabin ventilation air outlets located in the cabin ceiling blow air downward toward the passengers. An outlet for this location utilizes a series of high velocity jets exiting from a narrow ceiling nozzle to entrain cabin air to form a broad slow moving single jet. Three rows of slots are utilized, the outer rows to initially produce a wide air jet, and the center row to draw the outer jets back together outside of the nozzle. The center jets coalesce the outer jets into a slower moving total air stream.

4 Claims, 4 Drawing Sheets

AIRPLANE CABIN OVERHEAD AIR OUTLETS

BACKGROUND OF THE INVENTION

The present invention relates to cabin ventilation air outlets and more particularly to passenger cabin air outlets located in the cabin ceiling which blow air downward toward the passengers without causing drafts perceivable by passengers.

Problem Solved by the Invention

Prior main deck air distribution outlets were incorporated into the outboard and inboard stowage bins respectively. These locations represented the best placement for the outlets as it enabled the outlet to produce air jets with the maximum possible throw before reaching the seated passenger areas. The air jets are also projected in a horizontal direction and the airflow is initially attached to the stowage bins. This reduces the tendency of the jets to be affected by buoyancy forces.

In an effort to design flexible cabin interiors, the air distribution outlets have been relocated to the ceiling area. This was done to make the air distribution system independent of the stowbin configurations so that the lavatories and galleys could be reconfigured without changing the air distribution system.

This change brought the air outlets closer to the passenger seated area and reduces the required throw of the jet. A broad slow moving jet is required for this application to provide acceptable velocities in the seated areas. However, as the jet is now projected vertically and as the low velocity jet will entrain less cabin air, the jet velocities will be greatly affected by temperature differences between the supply air and cabin. During a heating mode, the jet velocity will be insufficient to overcome buoyancy effects and it will be unable to thoroughly penetrate the cooler cabin. This will result in adverse temperature gradients within the cabin. During a cooling mode, the velocities will be sufficient to project to the cabin wall and may cause a draft in the passenger seated areas.

Additionally, large dimensions required to produce a broad low velocity jet will result in a nozzle that is not aesthetically pleasing and too heavy.

Previous Attempts to Solve the Problem

Prior attempts to solve the problem resulted in nozzle designs as described above. The nozzle designs to some degree have had the problems similar to those described above.

BRIEF SUMMARY OF THE INVENTION

Passenger cabin ventilation air outlets located in the cabin ceiling for blowing air downward toward the passengers. The cabin ventilation air outlets entrain surrounding cabin air without causing drafts perceivable by passengers. A series of high velocity jets exiting from a narrow ceiling nozzle entrain cabin air to form a slow moving single jet, the slow moving jet providing draft mitigation.

Preferred Embodiment of the Invention

Three rows of slots are disposed within an inverted extruded chamber feeding the outlet nozzle. The outer rows of slots producing a wide air jet, the center row utilized to draw the outer jets back together outside the nozzle.

BRIEF DESCRIPTION OF THE SEVERAL VIEWS OF THE DRAWING

In the drawings illustrative of a preferred embodiment of the invention.

DETAILED DESCRIPTION OF A PREFERRED EMBODIMENT OF THE INVENTION

The hereinafter described nozzle uses a series of high velocity jets oriented in different directions in a pattern that repeats along the length of the nozzle. These high velocity jets entrain the surrounding cabin air and coalesce together a short distance from the nozzle to form a broad slow moving single jet. This broad slow moving jet provides the required low velocities in the passenger seated areas to prevent any sensation of draft. The increased surface area of the jet in contact with the cabin air provided by alternating jet pattern and the high velocity of the initial jets will result in the entrainment of large amounts of cabin air into the final jet. Entrainment is improved over prior attempts at using multiple outlets because the present staggered pattern draws air from the cabin not from the adjacent jets. During heating and cooling modes, the high entrainment ration of the jet will decrease the temperature difference between the jet and the cabin. The reduced temperature difference between the jet and cabin will reduce the effects of buoyancy forces in the cabin velocities and temperature gradients.

The present nozzle structure provides a nozzle with very small outlet dimensions at greatly reduce the visual impact of the nozzle on the cabin architecture. Geometry: The unique geometry of the present nozzle enables the alternating jets to be set up from a simple shape that is easily manufactured. The uniform cross section of the nozzle allows it to be manufactured inexpensively from an extruded thermoplastic. The alternating slot pattern can then be machined into the extrusion through the continuous slot.

Figure 1:
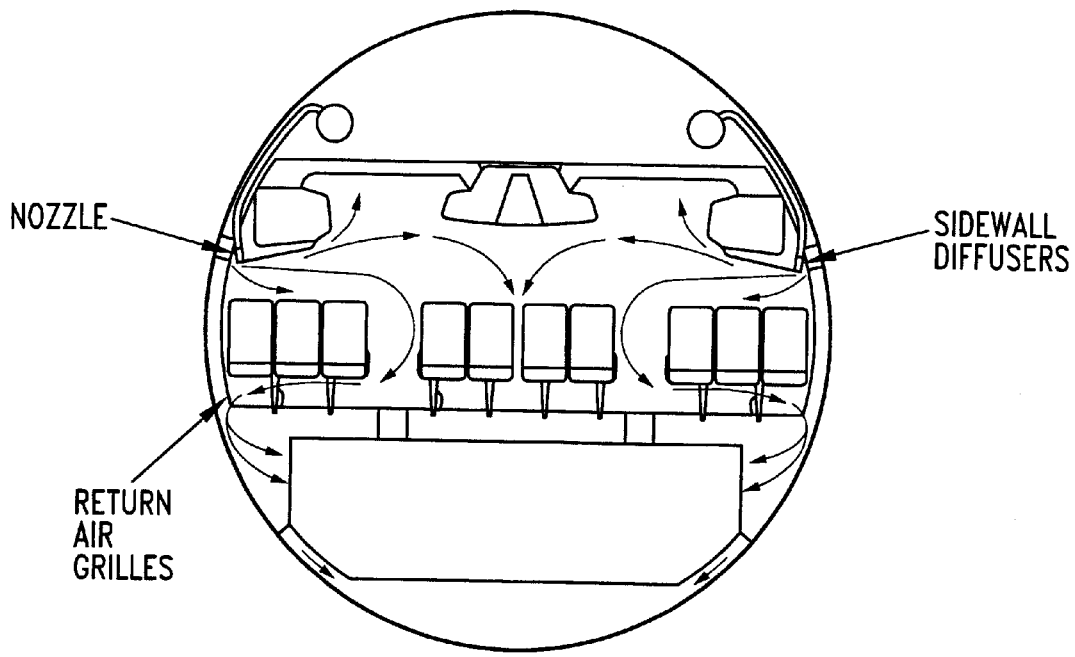
FIG. 1 is illustrative of prior cabin air distribution from outboard stowage bins.
Figure 2:
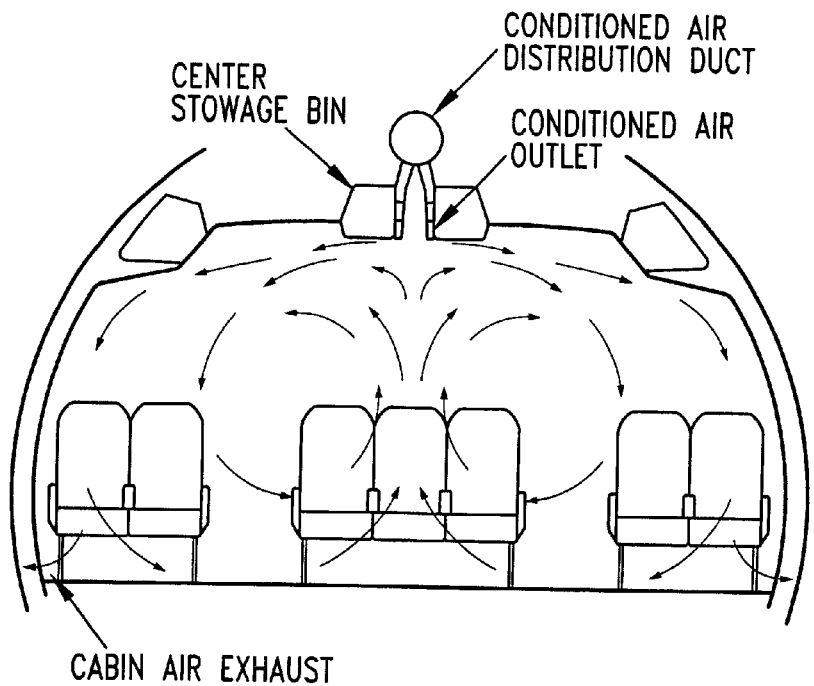
FIG. 2 is illustrative of air flow in prior cabin air distribution systems from inboard stowage bins.
Figure 3:
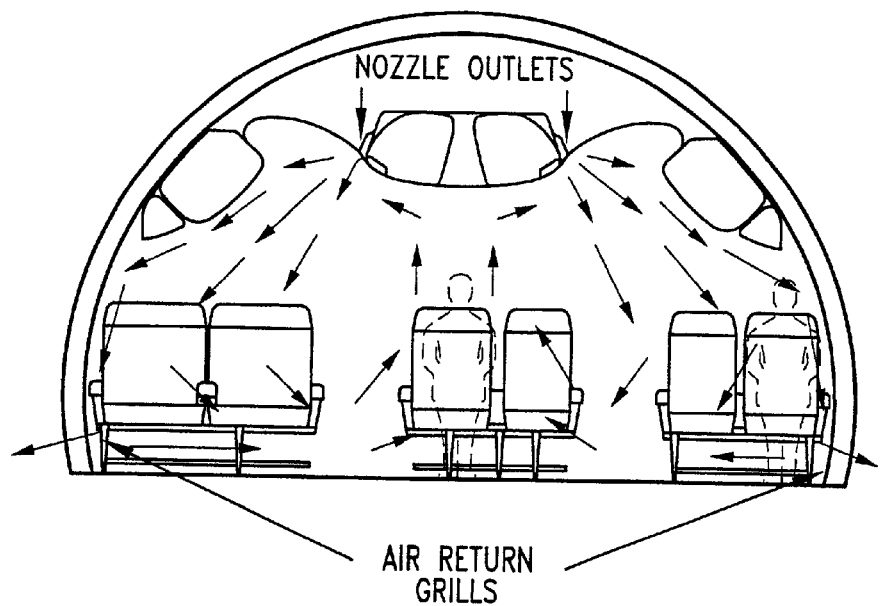
FIG. 3 is illustrative of cabin airflow in accordance with the present invention where the air distribution outlets as hereinafter described are located in the ceiling area.
Figure 4:
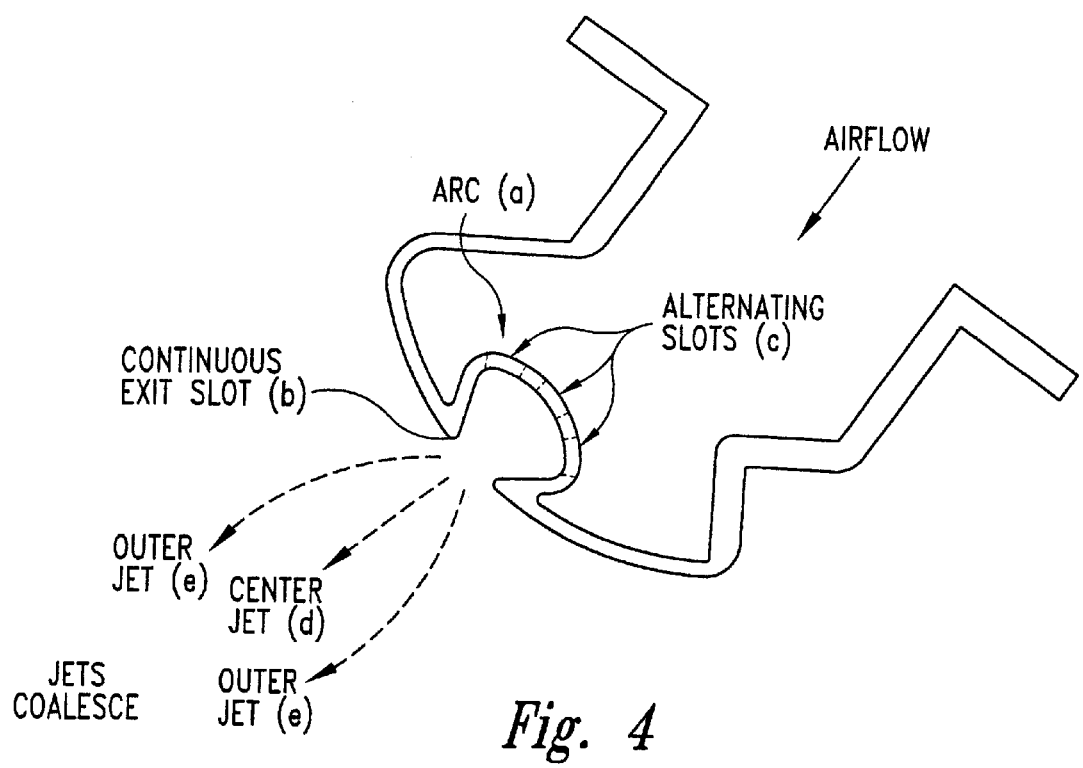
FIG. 4 is illustrative of the nozzle cross section showing the arc which forces the jets to converge through a common continuous slot.

The nozzle arc (a) as seen in FIG. 4 provides a surface perpendicular to the desired direction of the jet. This enables the jet to be directed without the use of any flow straightening device. The arc forces the jets to converge through a common continuous exit slot (b). This minimizes the dimensions of the exit slot. The alternating slot pattern (c) in the arc as seen in FIG. 4 generates jets that exit the continuous slot (b) in alternating directions. The present nozzle distributes air to the passengers from the ceiling area as seen in FIG. 3.

The function of the center jet (d) in the alternating pattern is to force all three jets to coalesce together. The throw of the jet can be controlled by balancing the proportion of airflow between the center (d) and outer jets (e).

Figure 5:
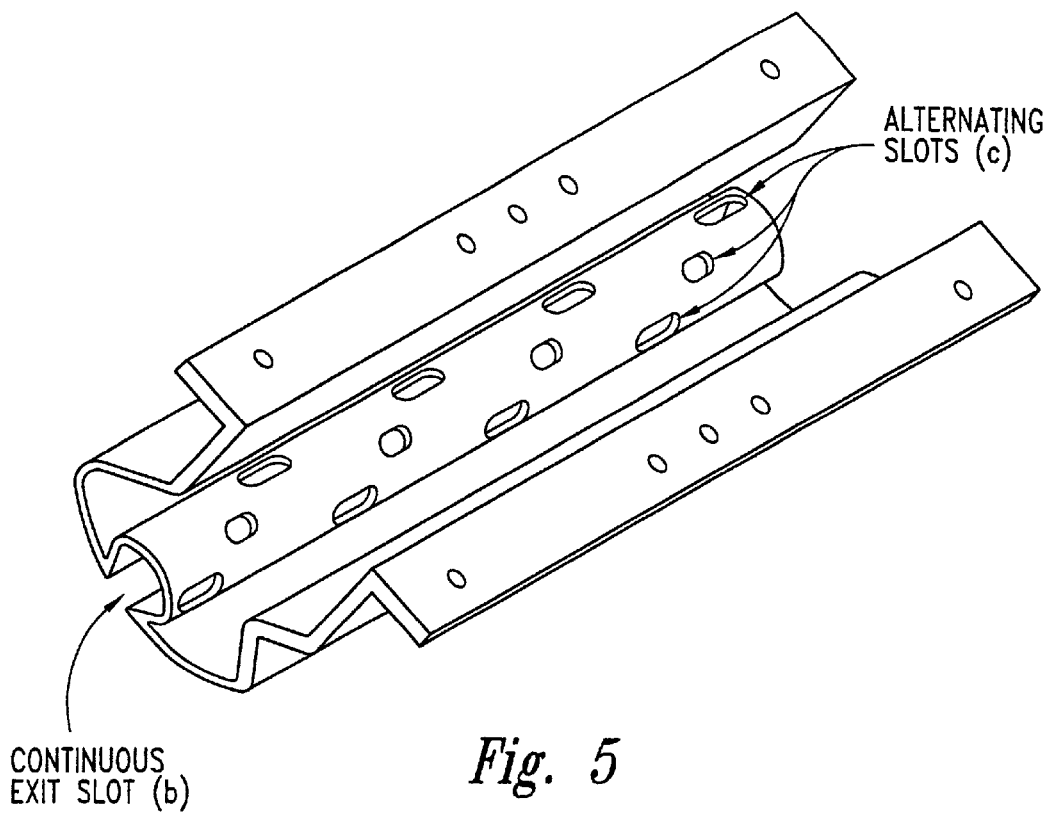
FIG. 5 is an isometric view of the present nozzle showing the continuous exit slot and alternating slot pattern in the arc for generating jets that exit the continuous slot in alternating direction.
Figure 6:
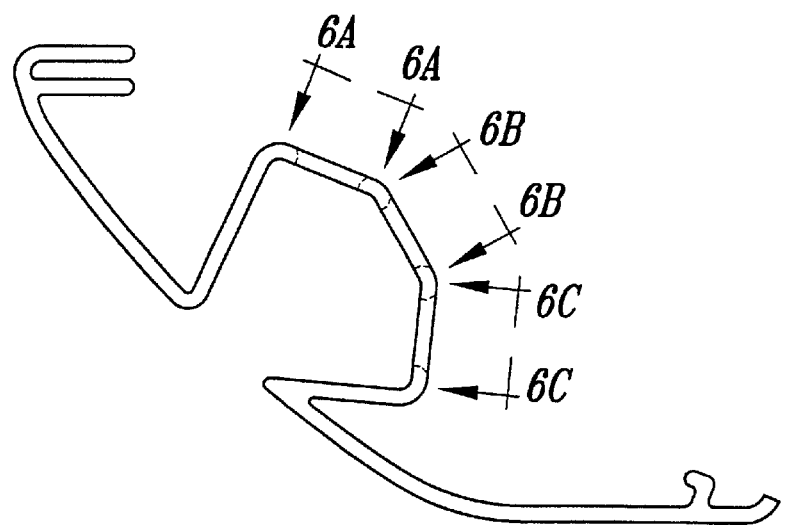
FIG. 6 is similar to FIG. 4 and is illustrative of nozzle cross section and arc or the diffuser nozzle design of FIG. 7 in which one of the outer row of slots is spaced further apart than the spacing of the other outer row of slots.
Figure 6A:
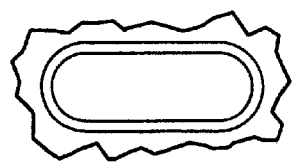
FIG. 6A is the dimension of the holes for the top row of holes of FIG. 7.
Figure 6B:
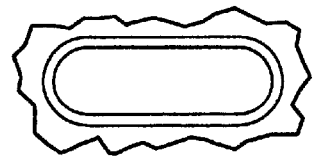
FIG. 6B is the dimension of the holes for the middle row of holes of FIG. 7.
Figure 6C:
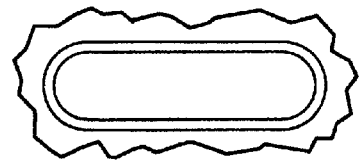
FIG. 6C is the dimension of the holes for the bottom row of holes of FIG. 7.
Figure 7:
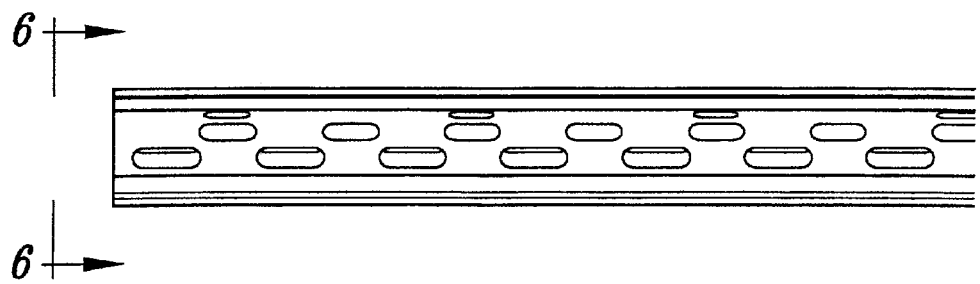
FIG. 7 represents the plan view of the nozzle from the back side.

Turning now to FIG. 6 and FIG. 7, it can be seen that the spacing (as seen in FIG. 7) of the upper row of outer slots skips every other position, i.e., the spacing is greater between slots in the upper one of the outer rows. This skipping in one of the outer rows of slots where discharging air through the enlarged continuous nozzle slot provides a lower velocity jet stream of air that is more diffuse. The diffuse pattern is thus enhanced by the alternating cutout slot. This top cutout slot configuration tends to interrupt the air's natural tendency to coalesce in the discharge stream out of the continuous slot nozzle. A further distinction between the pattern of the outer rows and inner row of slots of FIG. 7 (as detailed further in FIGS. 6A, 6B and 6C) configuration and the FIG. 4 and FIG. 5 configuration is that the slot pattern of the center row in FIGS. 4 and 5 is smaller than the outer slots.

In conclusion, the nozzle configuration of FIGS. 4 and 5 provide a concentrated stream of high velocity discharge into the cabin whereas the nozzle structure of FIGS. 6 and 7 provide a diffuse, lower velocity discharge stream of air to the cabin, thereby meeting a requirement of different cabin interior design.

What is claimed is:

1. An air aircraft passenger cabin ventilation system having an outlet nozzle comprising a continuous exit slot, said aircraft passenger cabin ventilation system having three rows of slots including a center rows and outer rows, said three rows disposed within an inverted extruded chamber for feeding said continuous exit slot, the outer rows providing a wide air jet and the center row drawing jets from the outer rows back together outside said outlet nozzle and wherein the flow area and orientation of said center row slots combined with said outer rows determine the discharge air flow direction.

2. The invention according to claim 1 wherein the spacing between slots in one of said outer rows is greater than the spacing between slots in the other one of said outer rows thereby providing less diffusion of the nozzle discharge jet on one side of the jet and different directional orientation of said nozzle jet than if the spacing of the outer rows were equivalent.

3. An airplane cabin overhead air outlet structure having a nozzle with sides converging towards one another and leading to an arc, said arc having a bottom portion forming a continuous exit slot, said arc having spaced alternating center slots and spaced outer slots on opposite sides of the center slots for allowing passage of air, all of said slots angled toward said continuous exit slot and forming a center jet and two outer jets, said center jet and two outer jets forming a broad, slow moving single jet, and said center jet drawing said two outer jets together outside said nozzle.

4. An airplane cabin overhead air outlet structure comprising:
   a nozzle having converging sides supported by an arc;
   said arc having three alternating rows of slots for passage of air;
   said alternating slots air oriented in an arc angled toward a continuous exit nozzle slot;
   said continuous exit airflow through alternating slots in arc forming a center jet and two outer jets through said nozzle slot;
   said center jet drawing said outer jets together outside said nozzle; and, said outer jets controlling diffusion rate and center jet nozzle discharge direction.

* * * * *